United States Patent [19]

Breu

[11] Patent Number: 4,577,885
[45] Date of Patent: Mar. 25, 1986

[54] TRAILER COUPLING

[75] Inventor: Johann Breu, Munich, Fed. Rep. of Germany

[73] Assignee: Rockinger Spezialfabrik für Anhängerkupplungen GmbH & Co., Fed. Rep. of Germany

[21] Appl. No.: 678,649

[22] Filed: Dec. 6, 1984

[30] Foreign Application Priority Data

Dec. 15, 1983 [DE] Fed. Rep. of Germany ....... 3345474

[51] Int. Cl.$^4$ .............................................. B60D 1/02
[52] U.S. Cl. ................................... 280/508; 280/515; 403/322
[58] Field of Search ............... 280/504, 507, 508, 509, 280/510, 515; 403/322

[56] References Cited

U.S. PATENT DOCUMENTS 1,939,463  12/1933  Rockinger ........................... 280/508

FOREIGN PATENT DOCUMENTS

| 807176 | 6/1951 | Fed. Rep. of Germany | 280/508 |
| 906662 | 3/1954 | Fed. Rep. of Germany | 280/508 |
| 913625 | 6/1954 | Fed. Rep. of Germany | 280/508 |
| 1095132 | 5/1961 | Fed. Rep. of Germany | 280/508 |
| 1292512 | 4/1969 | Fed. Rep. of Germany | 280/508 |
| 7821632 | 10/1978 | Fed. Rep. of Germany | 280/508 |
| 3226360 | 1/1984 | Fed. Rep. of Germany | 280/508 |

Primary Examiner—Joseph F. Peters, Jr.
Assistant Examiner—Everett G. Diederiks, Jr.
Attorney, Agent, or Firm—Toren, McGeady, Stanger, Goldberg & Kiel

[57] ABSTRACT

A trailer coupling is proposed which, after transference of the coupling bolt into the non-coupling position, is insensitive to small relative movements of the towing eye, still situated in the coupling body, in relation to the coupling body, that is to say does not drop back into the coupling position, and in which, on the other hand, the coupling bolt can be caused by the entry of the towing eye to return into the coupling position, without a repeated manual action upon the automatic coupling system being necessary.

6 Claims, 12 Drawing Figures

TRAILER COUPLING

The invention relates to a trailer coupling, comprising:

(a) a coupling body;

(b) a coupling bolt which is guided displaceably in the coupling body between a coupling position, with engagement through a towing eye, and a non-coupling position which permits the movement of the towing eye out of and into the coupling body;

(c) an opener lever pivotable about an opener lever pivot spindle and stressed by first spring means in the direction towards a securing position in which it secures the coupling bolt in its coupling position, and is transferable by an actuating shaft against the action of the first spring means into a holding position in which it holds the coupling bolt in the non-coupling position;

(d) a support lever, pivotable about a support lever pivot spindle, to support the opener lever in its holding position and (e) a release lever pivotable about the support lever pivot spindle displaceable transversely of this spindle and subjected to the rotating and displacement action of further spring means, which lever in the outward and inward movements of the towing eye travels through different sequences of operational positions and in the course of the operational position sequence effected by the entry of the towing eye transmits a release moment upon the support lever in the direction of elimination of its support function.

Such trailer couplings are known for example by public prior use of couplings of Type KU-300-06 of the firm Ing. Franz Cramer of Essen (see also Fed. German P.S. No. 906,662). It is characteristic of this class of couplings that after the coupling eye has been taken out of the coupling body no external intervention in the automatic coupling system is necessary to bring the automatic system into the "coupling readiness position", so that to couple up a trailer it is only necessary for the coupling eye to be driven in, with action upon the release lever.

In the known coupling the opener lever is seated non-rotatably on the actuating shaft, which is connected with an actuating hand lever. The support lever is produced in one piece with the release lever, pivotable in common with the latter about the support lever pivot spindle and guided displaceably on the latter by a slot. For the transference of the coupling bolt out of its coupling position into its non-coupling position the opener lever is turned, by means of the actuating shaft which carries it fast in rotation, out of its securing position into its holding position. In that action a cam path formed on the opener lever presses the combined support-release lever back in relation to the support lever pivot spindle against the action of the further spring means, with displacement of the slot, until the support part of the combined support-release lever can snap into a notch at the end of the cam path. Thus the opener lever is supported in its holding position and can no longer be returned out of the holding position by action upon the actuating shaft, but only by action upon the release lever. In the driving of the towing eye out of the coupling body the opener lever and the combined support and release lever carry out rotations in opposite directions about the axis of the actuating shaft and about the support lever pivot spindle, with rolling of the support lever part and the notch on the end of the cam path. In the driving of the towing eye into the coupling body the combined support and release lever is pivoted about the support lever pivot spindle, the support lever part emerging from the notch on the end of the cam path. The co-operation of the notch on the end of the cam path of the opener lever for the one part and of the support lever part of the combined support and release lever in this case is such that after only a very short distance of movement of the towing eye out of the coupling body the equally short re-entry distance of the towing eye then available suffices to cancel the support function, so that the opener lever then returns into its securing position and the coupling bolt returns into its coupling engagement position. This has the disadvantage that a slight to and fro movement of the towing eye in relation to the coupling body, after transference of the coupling bolt into its non-coupling position has taken place, can lead to a return of the coupling bolt into its coupling position with the consequence that the coupling bolt must be lifted again by the actuating shaft and this play, under unfavourable conditions, can repeat itself several times. It is always necessary to expect slight to and fro movement of the towing eye in relation to the coupling body after transference of the coupling bolt into its non-coupling position, in view of engine vibrations of the towing vehicle and/or resilient movements of the trailer. There is also the fact that even outward and inward movements the amplitude of which, in a single to and fro movement, does not suffice to eliminate the support function of the support lever, accumulate so that after repeated reciprocation the cancellation of the support function occurs.

As already indicated above, a further disadvantage of the known coupling is to be seen in that after transference of the opener lever into its holding position and of the coupling bolt into its non-coupling position has once taken place, release by hand in the direction of return of the coupling bolt into the coupling position is not possible, because the notch at the end of the cam path of the opener lever can no longer pass the tip of the support lever part of the combined support and release lever, even if a great moment acts upon the actuating shaft connected with the opener lever. This behaviour has the consequence that the coupling bolt can be transferred into its coupling position only by an entering towing eye. If for example it is desired to couple a cable loop into the coupling, in order to transfer the coupling bolt into its coupling position it is necessary to act with an instrument upon the release lever part of the combined support and release lever, which involves the danger of injury. One is compelled to the same dangerous manipulation if for example at the start of a lengthy period of operation without a trailer it is desired to lower the coupling bolt into the coupling position, without a trailer being coupled, to protect the lower guide of the coupling bolt in the coupling body against soiling.

The invention is based upon the problem of developing a trailer coupling of the above-stated classification so that when the coupling bolt is in the non-coupling position it can also be transferred into the coupling position by action through the manual actuation shaft, and further of ensuring that after transference of the coupling bolt into the non-coupling position the frequently unavoidable vibrations and relative movements of the towing eye still situated in the coupling body cannot lead to an unintended dropping of the coupling bolt into the coupling position.

For the solving of this problem the following measures are proposed:

(f) the actuating shaft is offset parallel to the opener lever pivot spindle;

(g) the support lever is seated non-rotatably and non-displaceably on the actuating shaft and is in drive engagement with the opener lever, so that on pivoting out of a rest position into a support position it entrains the opener lever out of its securing position into its holding position;

(h) the release lever is mounted rotatably and displaceably on the actuating shaft, and (i) on the support lever and the release lever there are formed release moment transmission stops which can be brought into a mutual engagement readiness position, with displacement of the release lever, when the towing eye is driving out and transmit a pivot release movement from the release lever to the support lever when the towing eye is driving in.

Thanks to the non-rotatable arrangement of the support lever on the actuating shaft it is possible with the solution according to the invention, even after the transference of the opener lever into its holding position and of the coupling bolt into its non-coupling position has taken place, to eliminate the support function of the support lever by rotation of the actuating shaft, since the support lever mounted on the actuating shaft without transverse displacement play can emerge from the detent holding it in the holding position of the opener lever on rotation of the support lever by the actuating shaft in exactly the same way as it is disengaged by the release lever on rotation of the support lever by means of the release moment transmission stops.

The division of the one-piece support and release lever of the known form of embodiment into a support lever connected fast in rotation with the actuating shaft and a release lever rotatable and transversely displaceable in relation to the rotating shaft and the transmission of the release moment from the release lever to the support lever by the release moment transmission stops have the consequence that in the case of small relative movements of the towing eye, still situated in the coupling body, in relation to the coupling body—since the release moment transmission stops have not yet arrived in the mutual engagement readiness position—action of the release lever upon the support lever is completely suppressed, so that the support effect of the support lever upon the opener lever is unshaken. The distance by which the towing eye must drive out of the coupling body so that the release moment transmission stops do at all come into the engagement readiness position can be determined as desired in design.

From a public prior use of trailer couplings of Rockinger Types 401 and 260 (see also Fed. German P.S. Nos. 807,176 and 913,265) it is known to arrange the actuating shaft offset parallel in relation to the opener lever pivot spindle, to fit the support lever non-rotatably and non-displaceably on the actuating shaft and to arrange it in drive engagement with the opener lever, so that in pivoting out of a rest position into a support position the support lever entrains the opener lever out of its securing position into its holding position. In this case the release lever is mounted rotatably but not displaceably on the actuating shaft. When the support lever is pivoted with the actuating shaft into its support position it comes firstly into engagement with a first detent of the opener lever. At engagement in this first detent the opener lever and the coupling bolt are already raised so far that the towing eye can drive out of the coupling body. In the driving of the towing eye out of the coupling body the release lever under the action of a spring follows the emerging towing eye until it strikes against a stop of the coupling body or of a pertinent catcher mouth. When the towing eye drives into the coupling body again the release lever is pressed back without exerting a release moment upon the support lever, so that the coupling bolt cannot yet be transferred into the coupling position by entry of the towing eye. Only after the support lever has been brought by further movement of the actuating shaft from outside into a second detent of the opener lever do release moment transmission stops of the release lever and of the support lever come into engagement with one another so that then on entry of the towing eye into the coupling body its action upon the release lever leads to lifting of the support lever out of the detents. This known coupling already has the advantage that unintentional coupling engagement on relative movements between towing eye and coupling body is precluded, but differs in classification from the forms of embodiment under consideration here in that the coupling readiness is constituted only after a repeated action from the exterior upon the actuating shaft.

By public prior use of a trailer coupling of the firm Rockinger, of Type 248 (see also Fed. German P.S. No. 1,095,132) it is further known to use an opener lever seated on a manual actuation shaft, for the transference of the coupling bolt out of its coupling position into its non-coupling position. On the end of the opener lever intended to co-operate with an engagement edge of the coupling bolt there is provided a notch which comes together with the engagement edge of the coupling bolt when the coupling bolt is lifted by rotation of the actuating shaft and the opener lever reaches its holding position in which it holds the coupling bolt in the non-coupling position. The automatic unit further comprises a release lever which is initially stressed by a spring contrary to the direction of entry of the towing eye. When the coupling bolt is transferred into the non-coupling position but the towing eye is still driven in the release lever lies upon the inner end of the towing eye under the action of the spring. When the towing eye moves out the release lever follows it under the action of the spring action acting upon it, and then the release lever comes into engagement with a secondary arm in a notch on the lower end of the coupling bolt and in doing so lifts the coupling bolt, so that the end of the opener lever can disengage itself from engagement with the engagement edge of the coupling bolt. The coupling bolt is then held only by the secondary arm of the release lever. If the towing eye drives into the coupling body again, the release lever is pressed back and comes with its secondary arm out of the notch at the lower end of the coupling bolt. The coupling bolt is then liberated for movement into the coupling position, and passes into the coupling position as soon as the release lever is deflected by the towing eye so far that a support lever fitted on the release lever has come out of engagement with a stop on the opener lever and thus the opener lever can follow the coupling bolt into the coupling position.

This known form of embodiment differs from the object of the invention in as much as again the opener lever is seated non-rotatably on the actuating shaft. A manual transference of the coupling bolt out of the non-coupling position into the coupling position is rendered possible in this form of embodiment only in that an additional manual actuation member is fitted on the release lever (see also Fed. German Utility Model No. 7,821,632). This coupling construction type can be used sensibly in practice only where a cylindrical coupling bolt is used, since only in the case of a cylindrical form of embodiment of the coupling bolt is co-operation of the secondary arm of the release lever with a notch of the coupling bolt possible. The form of embodiment with a cylindrical coupling bolt is therfore desired as a rule only for agricultural trailer couplings and not for lorry trailer couplings. Moreover this latter form of embodiment differs from that according to the invention also in that the release lever is non-displaceably mounted and combined in one piece with the support lever.

The controlling of the release lever in the trailer coupling according to the invention can be brought about in a simple, reliable and robust manner in that the release lever is controlled by the further spring means, at least one pair of co-operating control stops on the release lever and on the coupling body and by the entry and exit of the towing eye, in such a way that (a) in the transference of the support lever out of the rest position into the support position and when it is in its support position, the release lever is held by the control stops and the towing eye, against the action of the further spring means, in a first operational position in which the one release moment transmission stop pertaining to it is out of engagement readiness in relation to the other release moment transmission stop pertaining to the support lever;

(b) in outward movement of the towing eye the release lever is pivoted and displaced under the action of the further spring means into a second operational position in which the control stops are lifted away from one another and the release moment transmission stops are in the engagement readiness position, and (c) the release lever is pivoted by the entering towing eye out of the second operational position, entraining the support lever, by the co-operating release moment transmission stops initially until the control stops have met again, and then is simultaneously pivoted and displaced in the direction towards the first operational position, so that after removal of the support lever from its support position the release moment transmission stops are again out of engagement readiness.

In accordance with a further aspect of the invention, cooperating and training stops are provided on the release lever and support lever, which stops, in the transference of the release lever into the rest position, come together and bring the release lever into a third operational position in which the release lever is lifted away from the towing eye. This measures brings further advantages for the behaviour of the trailer coupling. First, it ensures that even with disengagement of the coupling bolt out of its non-coupling position by manual action upon the actuating shaft, the release lever is returned in the direction towards the second operational position, or further. Also this measure offers the advantage that the release lever can be lifted out of engagement with the towing eye, so that constant knocking of the release lever on the towing eye during travel is suppressed.

In accordance with another aspect of the invention, the further spring means are formed by a torsion spring which initially stresses the release lever and the support lever in the direction of rotation in relation to one another and, at the same time, initially stresses the release lever in the displacement direction in relation to the actuating shaft. This development supports the simple construction inasmuch as one single spring can be used for two different spring functions.

In accordance with another aspect of the invention, the coupling bolt engages with a convex section in the towing eye. This measure is intended to indicate that the solution according to the invention, in contrast to the last-discussed solution pertaining to the prior art, is usable even when the coupling bolt possesses a form departing from the cylindrical.

BRIEF DESCRIPTION OF THE DRAWINGS

The accompanying Figures explain the invention by reference to an example of embodiment, and in fact

FIG. 1 shows the coupling in the closed or coupled position.

FIGS. 2-8 show intermediate positions of the coupling between the coupled to the uncoupled positions.

FIG. 9 shows the coupling in the open or uncoupled position and

FIGS. 10-12 show intermediate positions of the coupling between the uncoupled and the coupled positions.

DESCRIPTION OF THE PREFERRED EMBODIMENT

Figure 1:
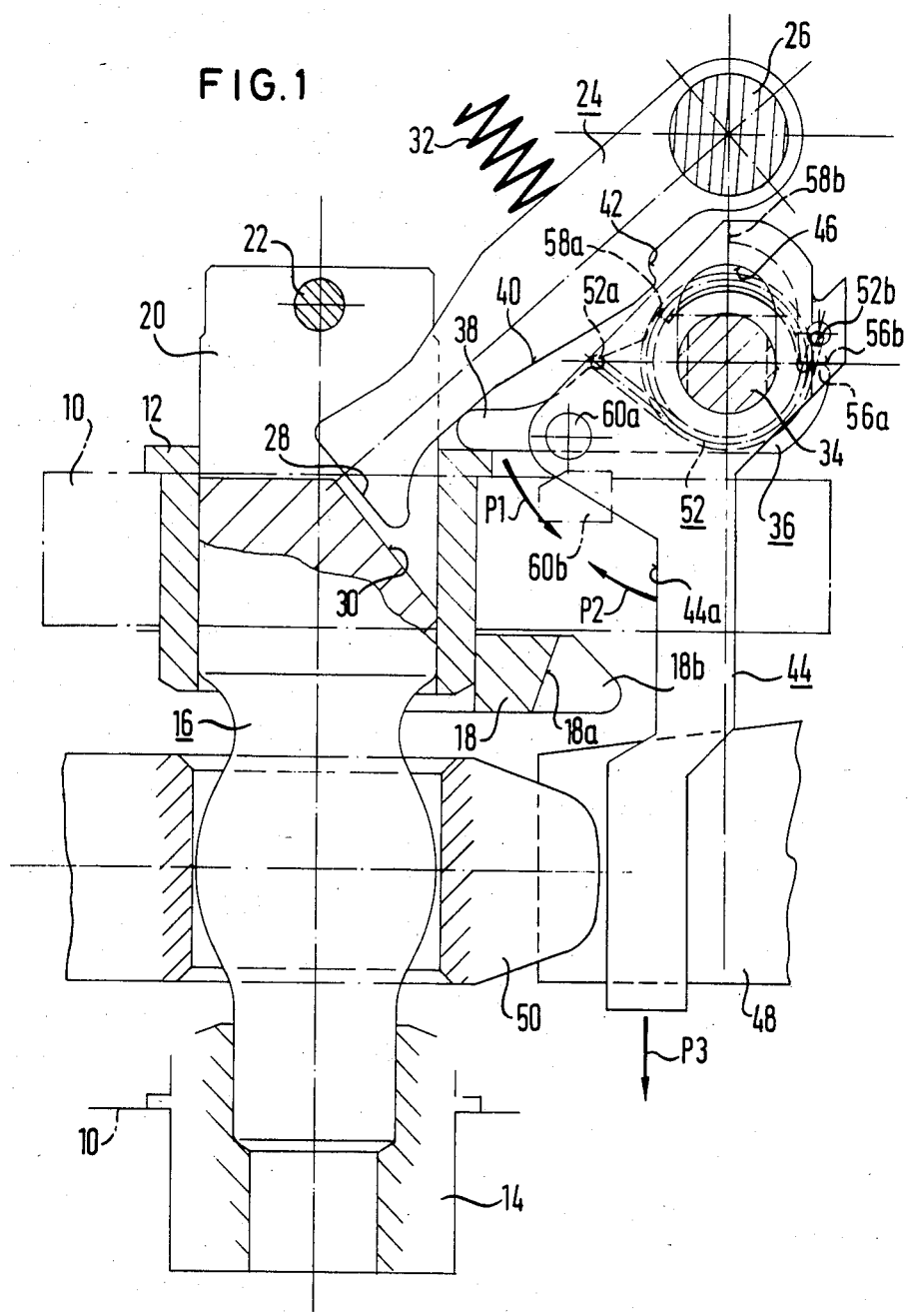
FIGS. 1 to 12 represent different states of operation of the trailer coupling.

In FIG. 1 the coupling body is designated by 10. This coupling body comprises guide bushes 12 and 14 for a coupling bolt 16. The coupling body 10 carries the coupling mouth of which only the upper lug 18 is entered. The coupling bolt 16 is situated in the coupling position in FIG. 1. At the upper end the coupling bolt 16 is provided with a slot 20 which is bridged over by a lifter bolt 22. In the slot 20 there engages an opener lever 24 which is rotatably mounted on an opener lever pivot spindle 26 arranged in the coupling body. The opener lever 24 is placed with its free end 28 opposite to a ramp 30 of the bottom of the slot, so that in the coupling position as shown the coupling bolt 16 is secured by the opener lever 24. The opener lever 24 is initially stressed or spring biased into its securing position as illustrated in FIG. 1 by a diagrammatically indicated first spring 32.

An actuating shaft 34 is furthermore rotatably mounted in the coupling body. A support lever 36 having an entraining and support tip 38 is non-rotatably seated on this actuating shaft 34. The entraining and support tip 38 lies against an entraining edge 40 of the opener lever 24 and can snap into a support detent 42 of the opener lever 24.

A release lever 44 is guided displaceably and pivotably by means of a slot 46 on the actuating shaft 34. The lower end of the release lever 44 is arranged between two stop jaws 48 for a towing eye 50 and stands opposite to the towing eye 50 at its end entering the coupling body. A torsion spring 52, wound around the actuating shaft 34 or a hub of the support lever 36 and rotatable in relation to the actuating shaft 34, is supported with its one end 52a on the support lever 36 and engages with its other end 52b on the release lever 44. This torsion spring seeks to bring the support lever 36 and the release lever 44 closer to one another in the direction of the rotation arrows P1, P2. Furthermore it seeks to shift the release lever 44 with its slot 46 downwards in the direction of the displacement arrow P3 in relation to the actuating shaft 34. In FIG. 1 the entraining and support tip 38 of the support lever 36 lies on the bush 12 and the opener lever 24 lies with its entraining edge 40 on the entraining and support tip 38. The release lever 44 is held fast in the position in rotation and sliding as illustrated in FIG. 1, against the action of the torsion spring 52, by the fact that an entraining stop 56a of the support lever 36 abuts on an entraining stop 56b of the release lever 44.

On the support lever 36 there is fitted a release moment transmission stop 58a which can co-operate with a release moment transmission stop 58b of the release lever 44.

On the support lever 36 there is further fitted a control stop 60a which can co-operate with a control stop 60b of the coupling body.

It should be noted that according to FIG. 1 the control stops 60a and 60b are at a certain distance from one another so that the driving in of the towing eye 50 beyond a pre-determined position, for example as a result of wear of the towing eye 50 or of the stop jaws 48, cannot lead to a destructive effect upon the release lever 44, but this can yield to the right in FIG. 1.

Figure 2:
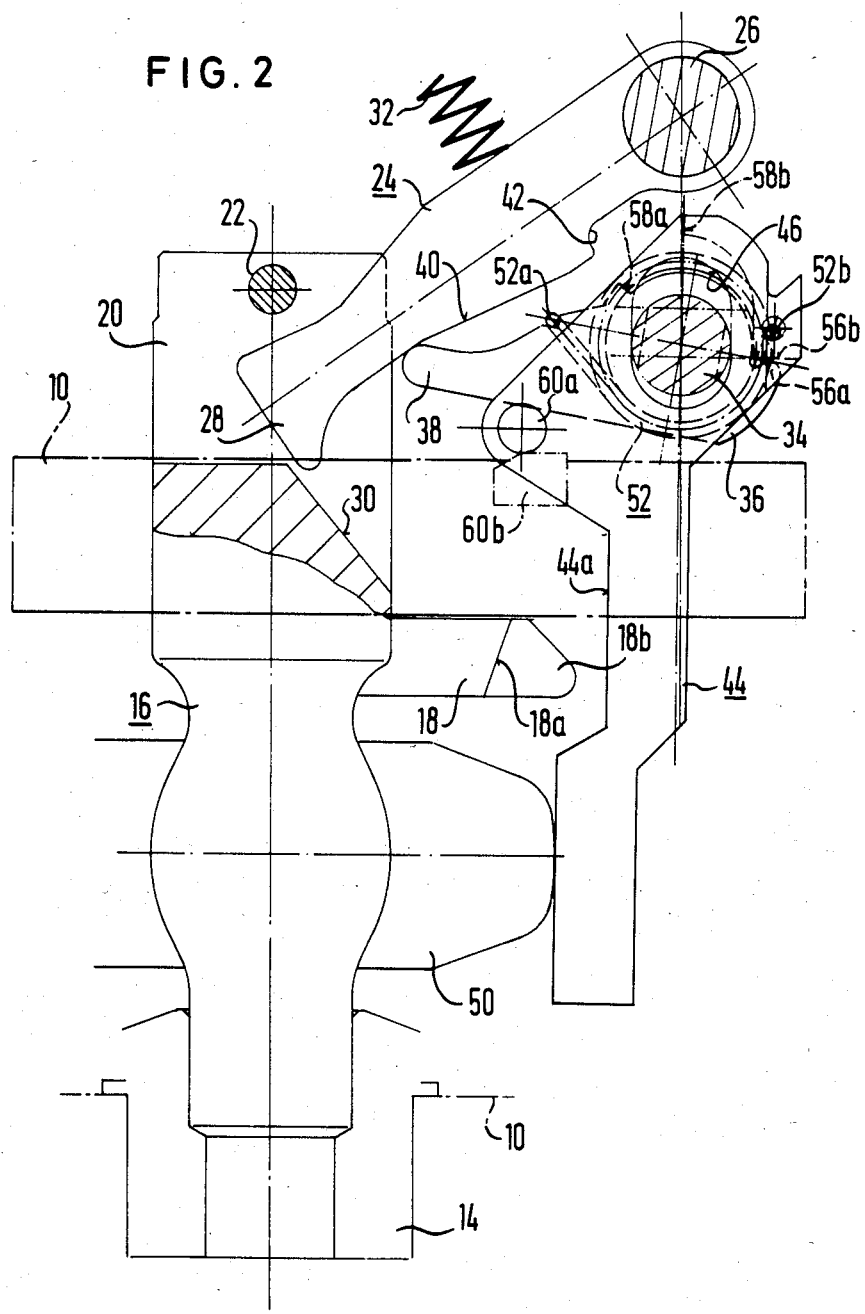
Figure 3:
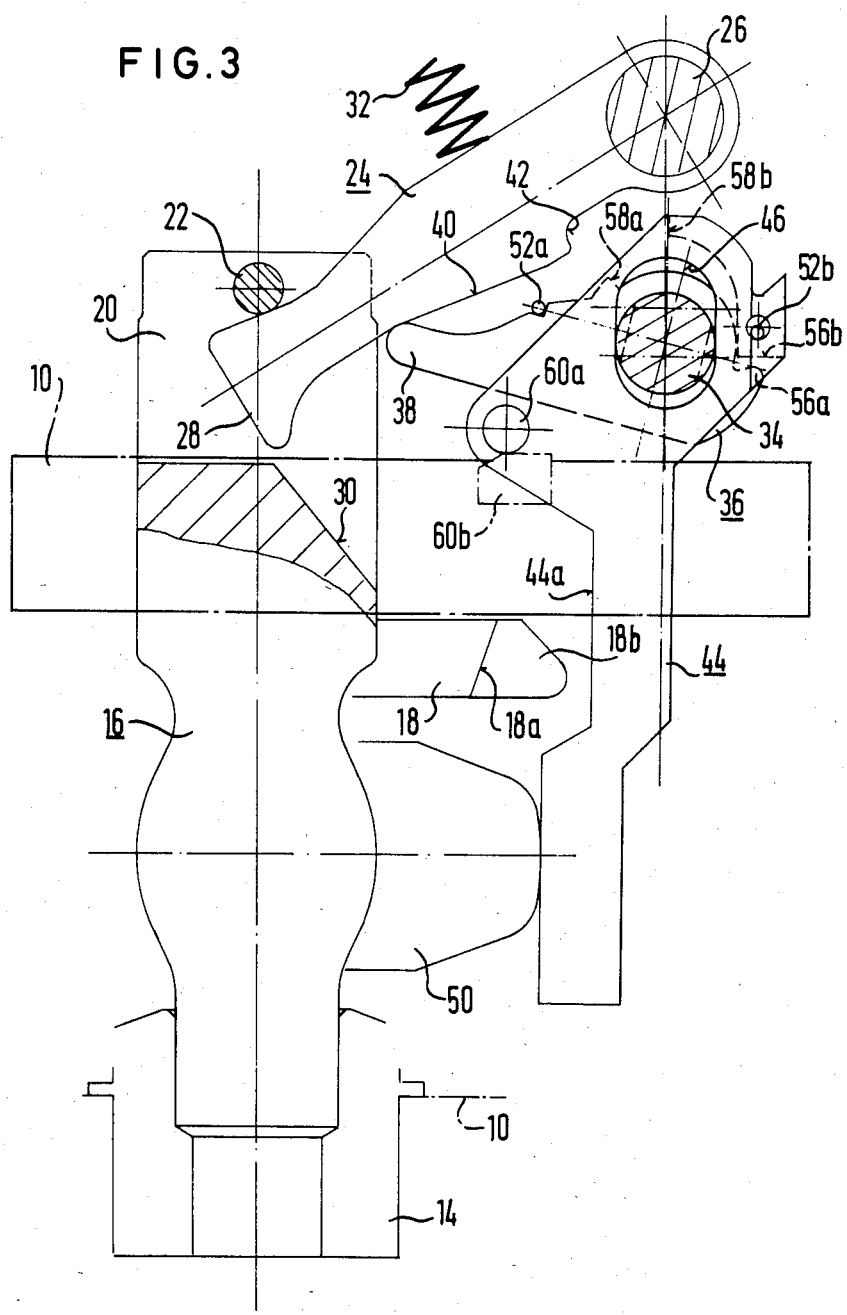
Figure 4:
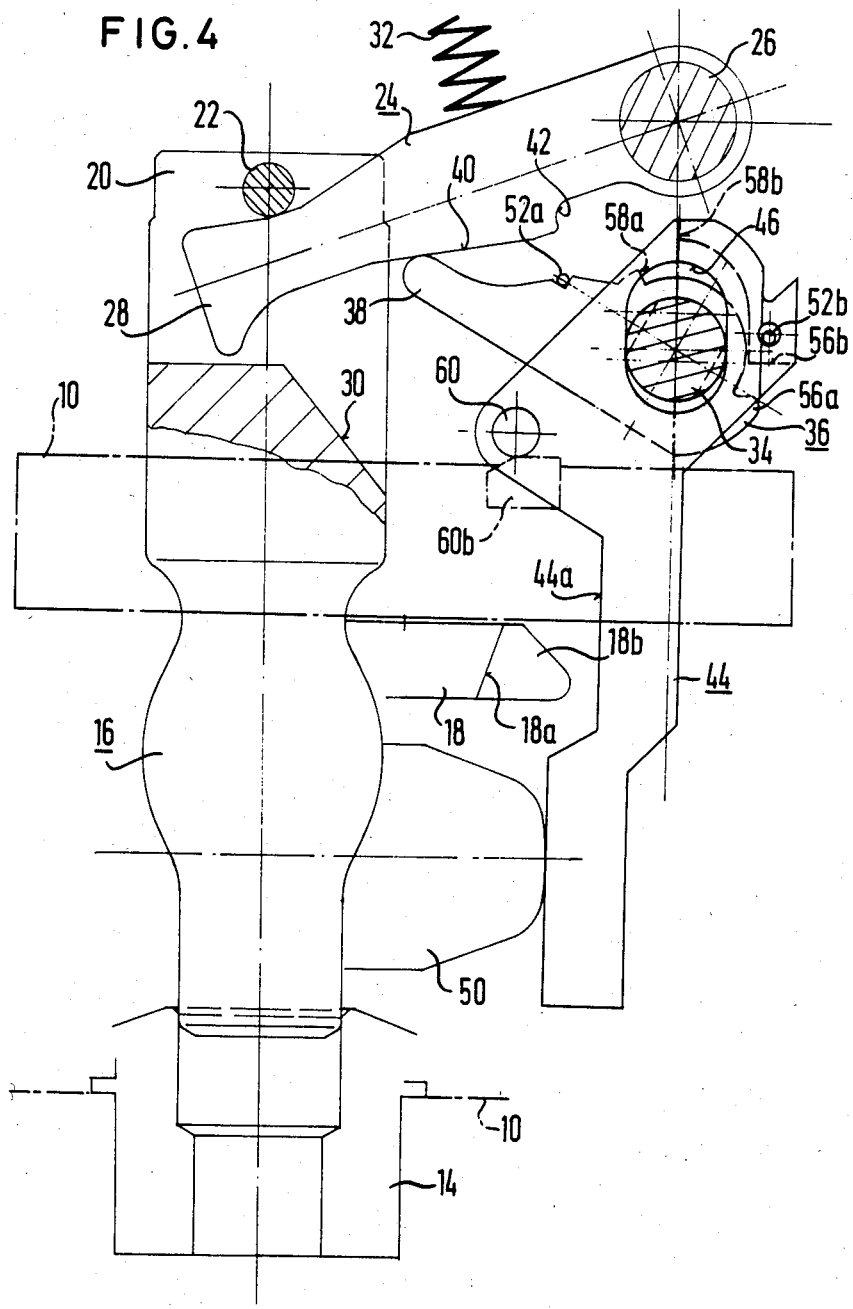
Figure 5:
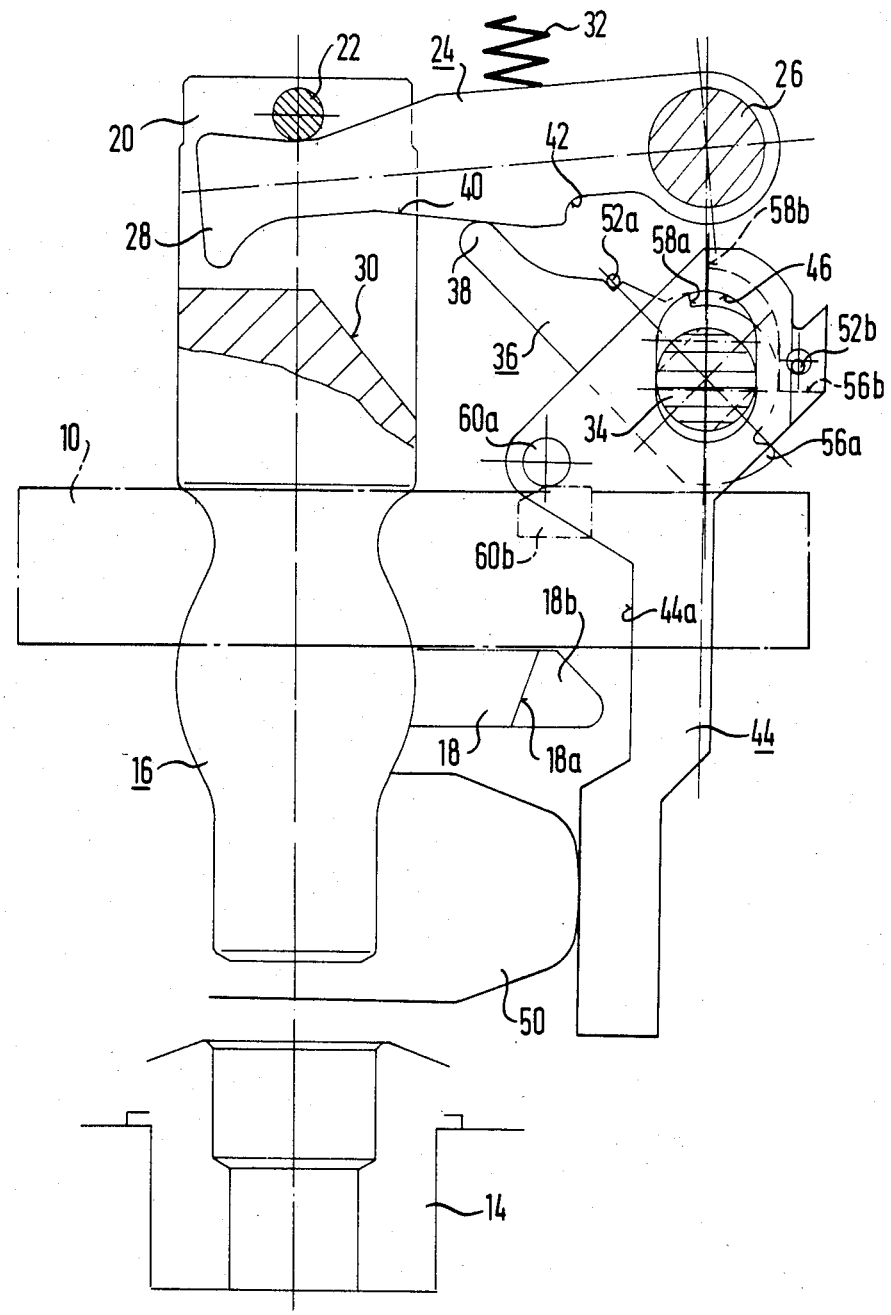
Figure 6:
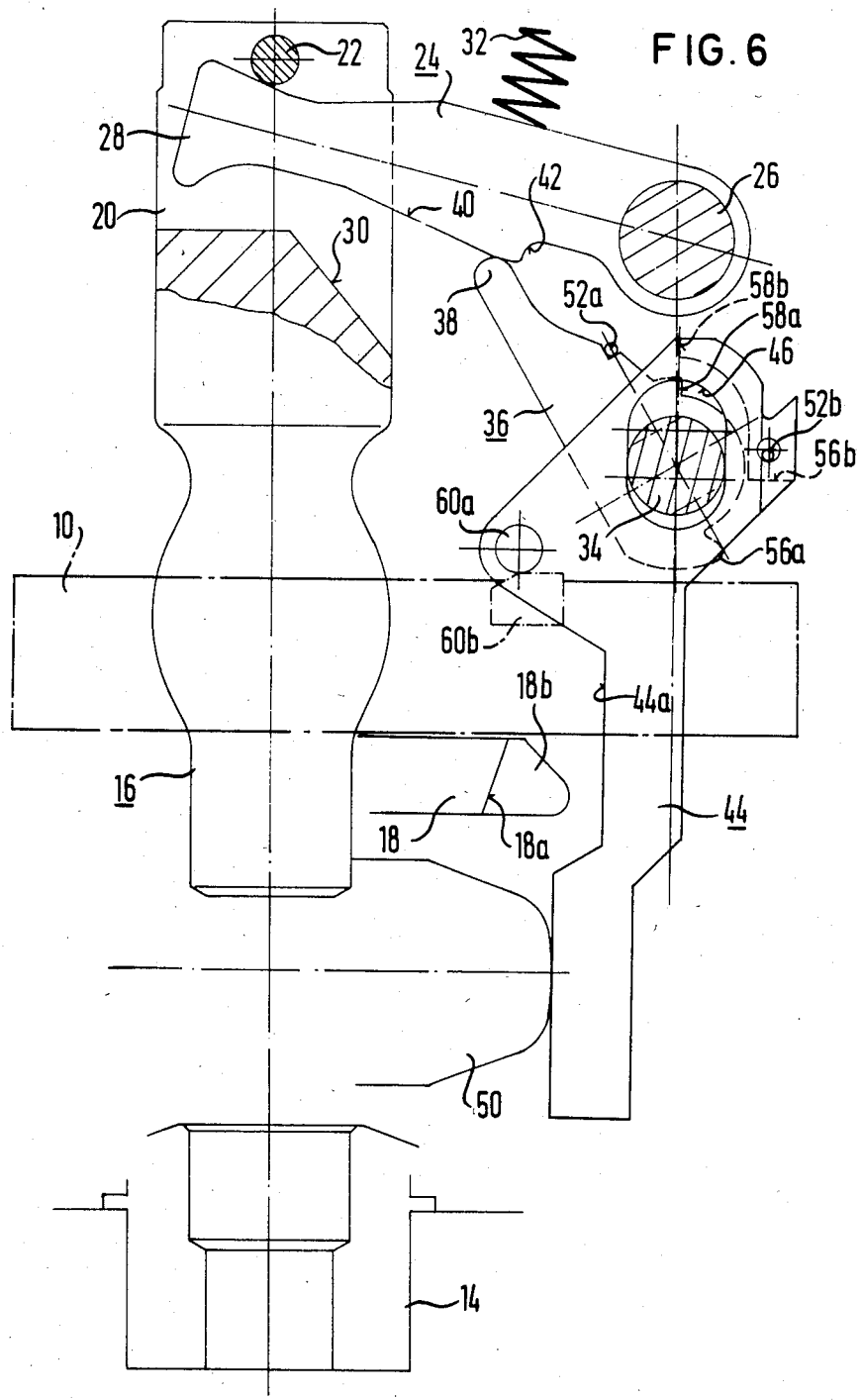
Figure 7:
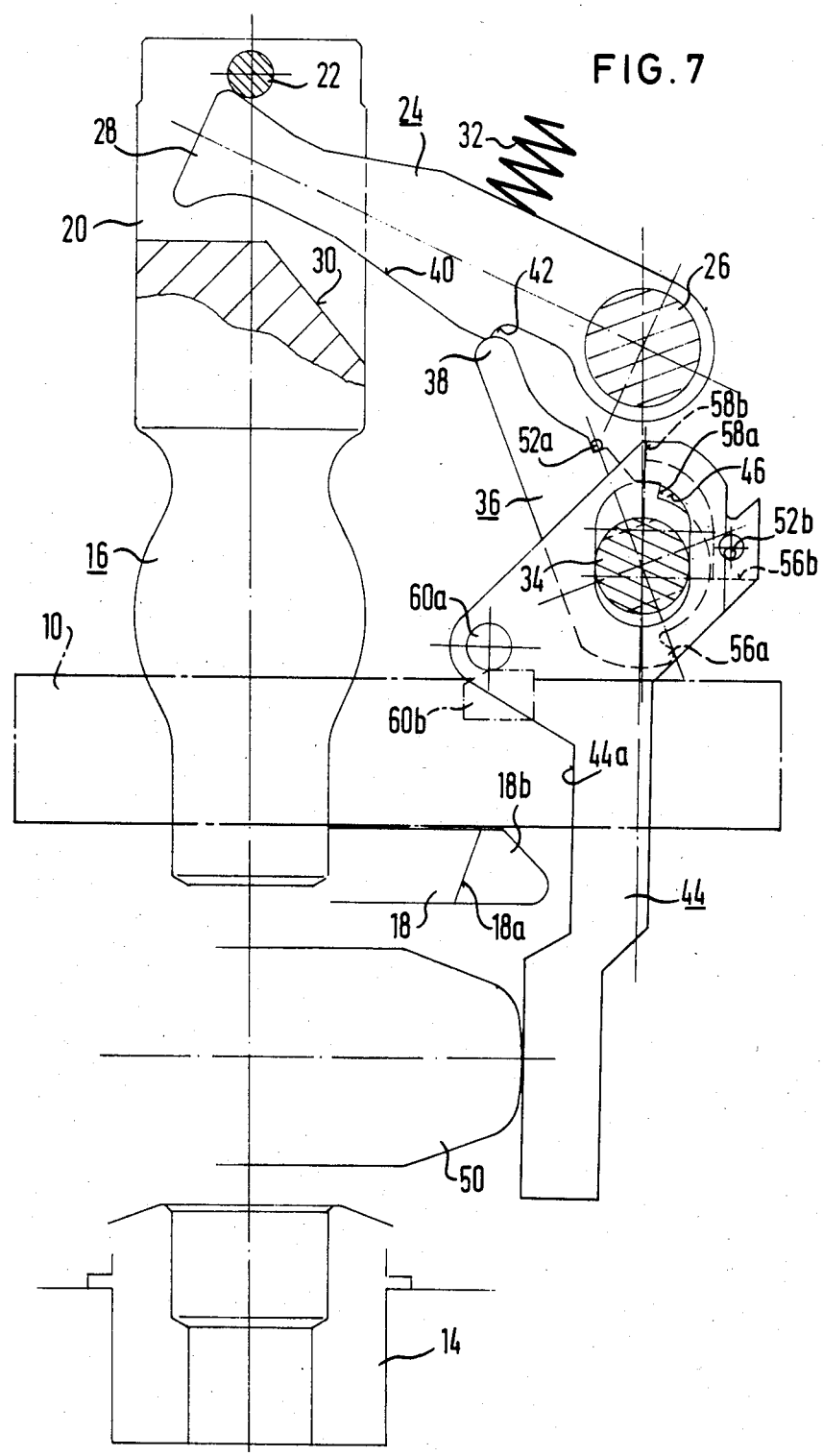

In FIG. 2 the actuating shaft 34 has been turned in the clockwise direction from the position in FIG. 1 by manual action, so that the entraining and support tip 38 has begun to turn the opener lever 24 likewise in the clockwise direction. The entraining stop 56b has followed the entraining stop 56a downwards so that the release lever 44 has simultaneously turned in the clockwise direction and shifted downwards, the control stop 60a has run against the control stop 60b and the release lever 44 has run against the towing eye 50. The position of the release lever 44 thus achieved is designated as the first operational position, while the position of the release lever 44 according to FIG. 1 is designated as the third operational position.

In FIGS. 3 to 7 the support lever 36 has been rotated one step further in the clockwise direction in each Figure. Accordingly, the opener lever 24 has also been turned further in the clockwise direction, has departed from the ramp 30 out of the securing position and, through the lifter bolt 22, has lifted the coupling bolt 16 up out of its coupling position according to FIG. 1, the non-coupling position of the coupling bolt 16, in which the towing eye 50 can drive in and out, having been reached in FIG. 7. The position of the release lever (first operational position) has remained unchanged and is still determined, as before, by the abutment of the release lever 44 on the towing eye 16 and by the abutment of the control stops 60a, 60b on one another.

Figure 8:
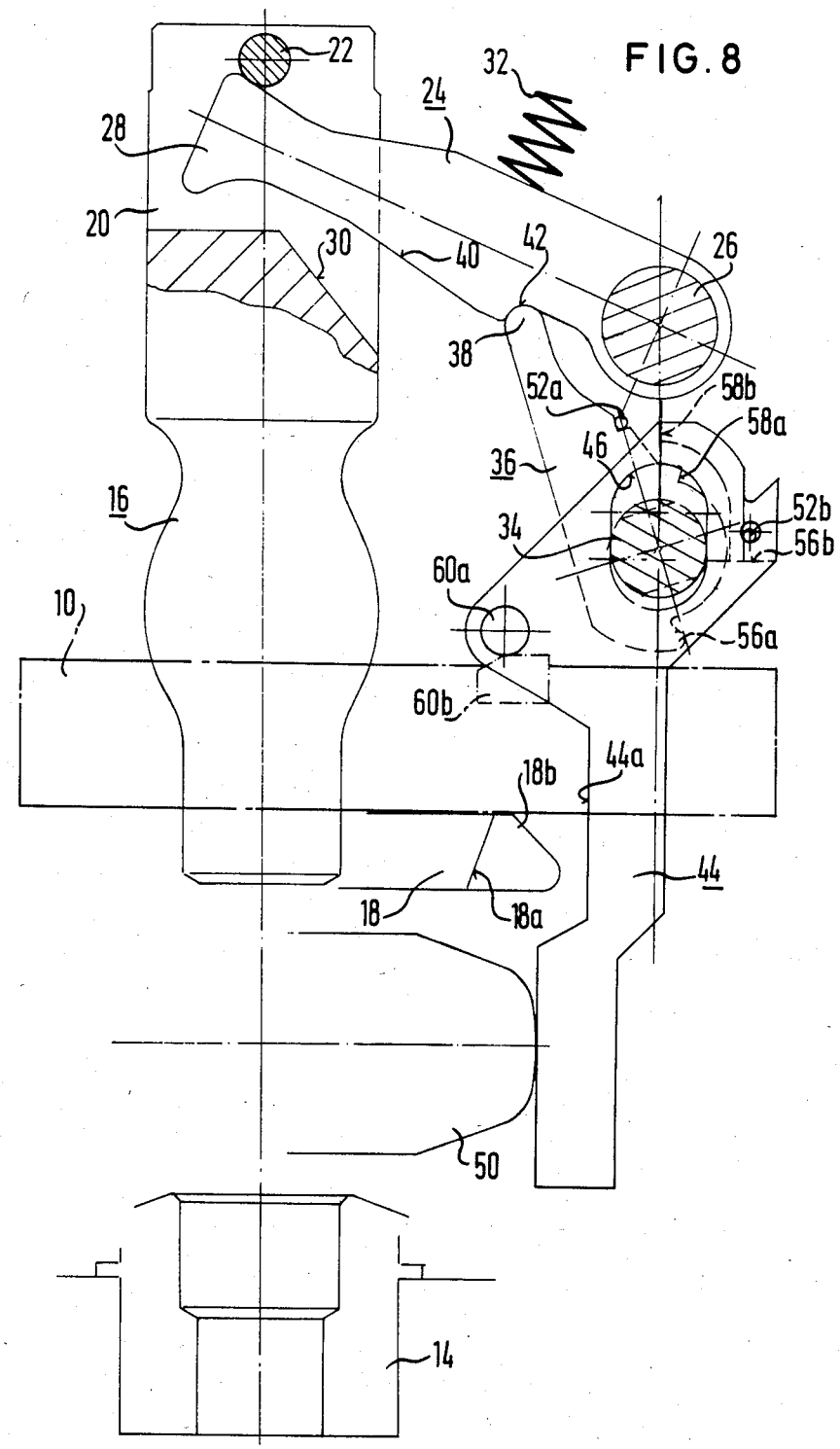

In FIG. 8 the entraining and support tip 38 of the support lever 34 has entered the support notch 42 of the opener lever 24. The opener lever 24 now remains in the holding position as represented in FIG. 8 due to the fact that the support lever 36 is situated in the support position, even if there is no longer any external moment acting upon the actuating shaft 34. The release lever 44 still occupies its first operational position even in FIG. 8. In FIG. 8 that operational condition is reached in which the towing eye can come out of the coupling, for example by forward movement of the tractor in relation to the trailer. In this case it is not necessary to put a hand to the coupling during the uncoupling of tractor and trailer.

Figure 9:
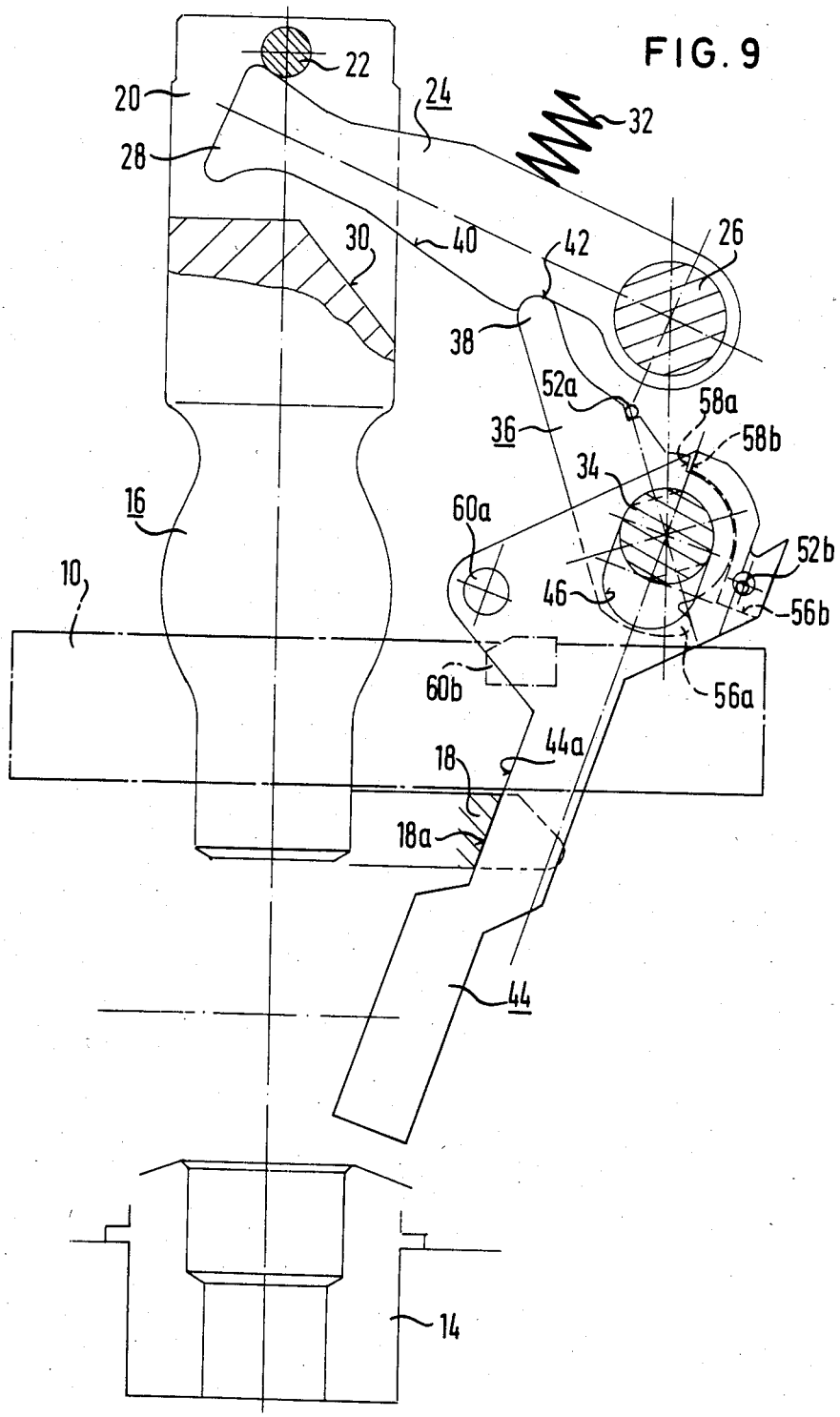

In FIG. 9 the towing eye 50 has come out of the coupling body and the release lever 44 has lost its support on the towing eye and has passed under the action of the torsion spring 52 into the operational position as shown in FIG. 9, in which it rests with the upper end of the slot 46 on the actuating shaft 34 and with one edge 44a on a stop face 18a of the coupling mouth. This stop face 18a forms the bottom of a slot 18b in the upper lug 18 of the entry mouth so that the entry mouth, after the towing eye has been taken out, is now locked by the release lever 44 against twisting about the axis of the coupling bolt 16. The release moment transmission stop 58b of the release lever 44 is now situated in the engagement readiness position opposite to the release moment transmission stop 58a of the support lever 36. This position of the release lever 44 is designated in claim 2 as its second operational position. The opener lever 24 is still supported in its holding position by the support lever 36, so that the coupling bolt 16 continues to be situated in its non-coupling position.

Figure 10:
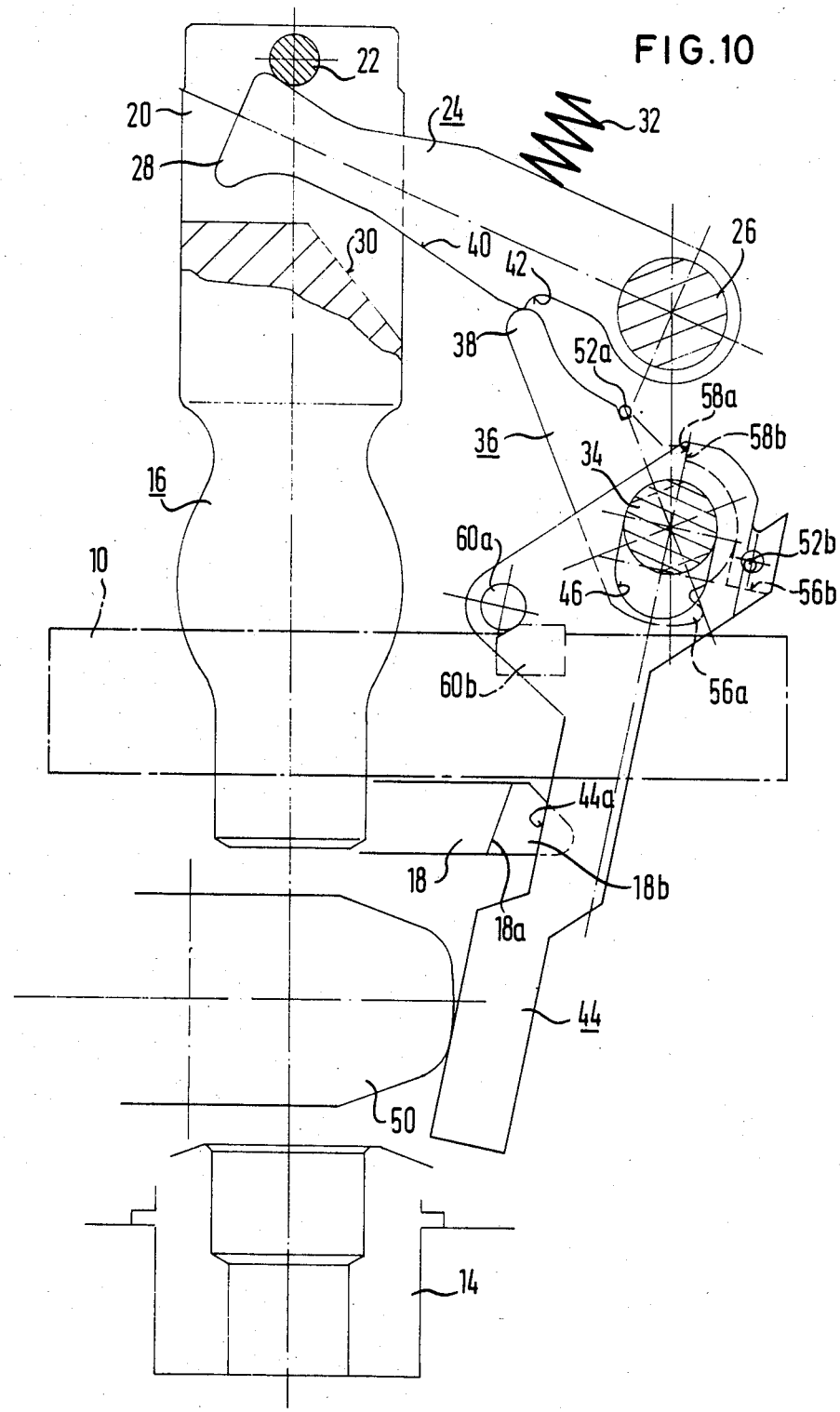
Figure 11:
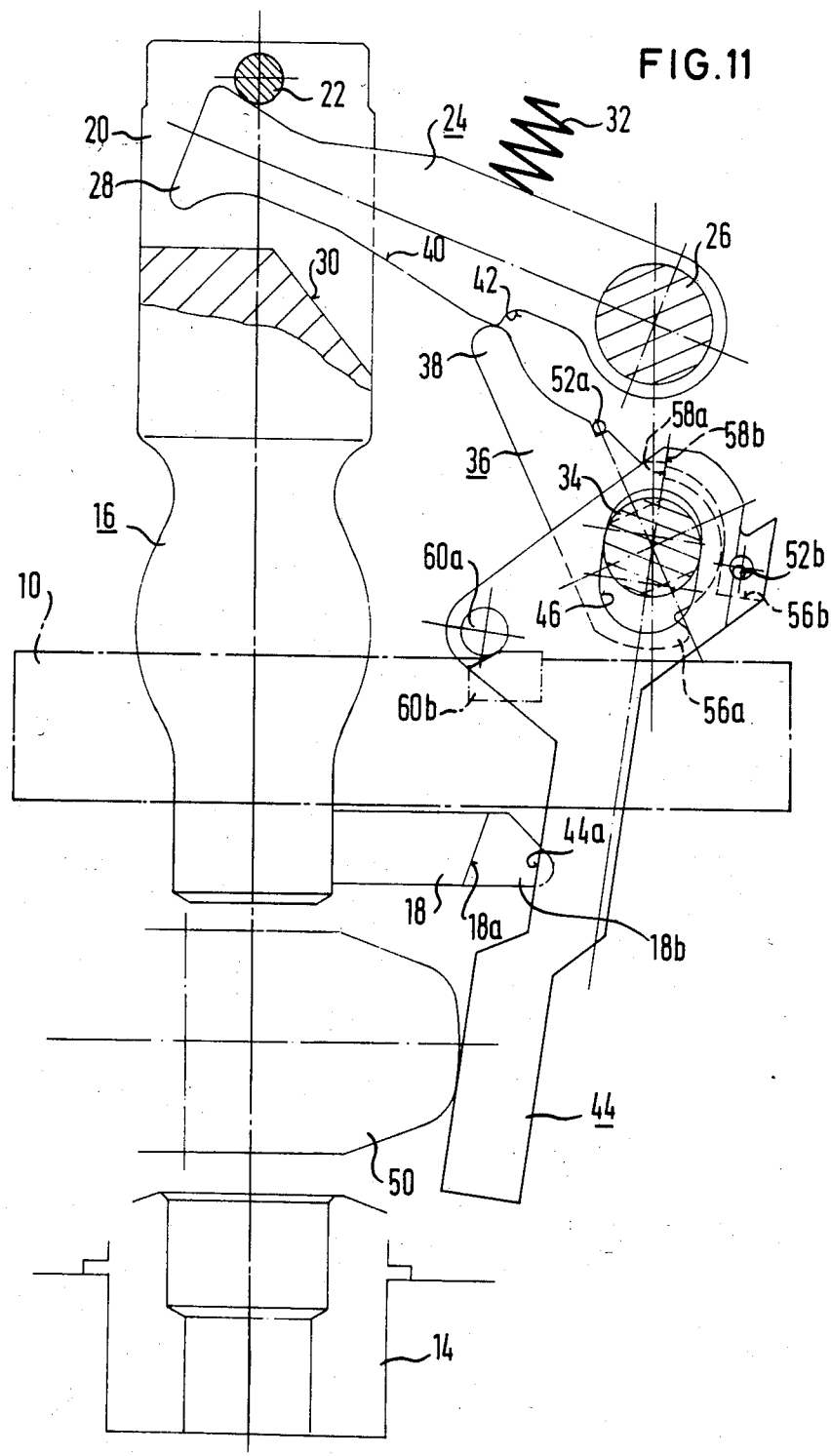

According to FIG. 10 the towing eye 50 is just beginning to enter the coupling body. Here the release lever 44 has already been pivoted about the actuating shaft 34 so far, compared with the condition according to FIG. 9, that the control stop 60a has come against the control stop 60b. Here the support lever 36 has been pivoted by the release moment transmission stops 58a and 58b so far in the anti-clockwise direction that the entraining and support tip 38 has moved out of the support notch 42. According to FIG. 11 the release lever 44 has been pivoted further in the counter-clockwise direction about the actuating shaft 34, by further entry of the towing eye 50, and at the same time has been shifted upwards with its slot 46 in relation to the actuating shaft 34, whereby the release moment transmission stops 58a and 58b have begun to disengage from one another. The position according to FIG. 11 is to be regarded as a representation of one moment which persists only for an infinitely short time, since the entraining and support tip 38 has already emerged from the support notch 42 and the strong spring 32 causes the opener lever 24, the support lever 36 and the coupling bolt 16 to descend suddenly. A further such representation of a moment is represented in FIG. 12 where the release moment transmission stops 58a and 58b have already disengaged completely from one another, so that the release lever 44 has again entered the first operational position according to FIGS. 2 to 8.

Figure 12:
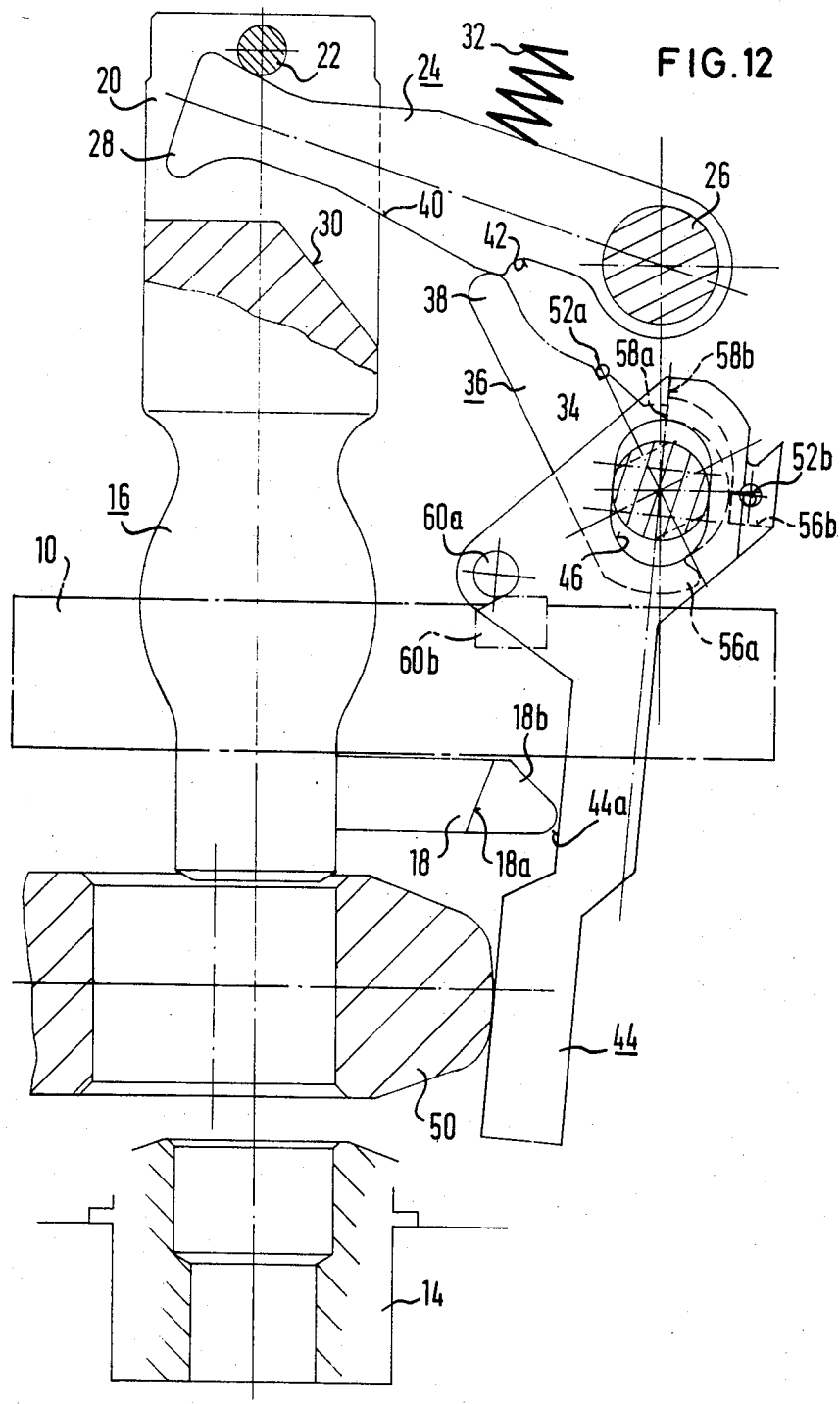

In the further transition from FIG. 12 to FIG. 1 the entraining stop 56a strikes upon the entraining stop 56b and thus leads the release lever 44 back into the operational position according to FIG. 1, which is designated as the third operational position of the release lever.

With the solution according to the invention the space requirement is slight inasmuch as the actuating shaft 34 lies beneath the opener lever pivot spindle 26. This signifies that the path of the free end of a manual actuation lever connected with the actuating shaft 34 approximates to the external contour of the coupling and therefore the free space required for the free end of the manual actuation lever approximates to the external contour of the coupling.

It is further to be noted that in the solution according to the invention favourable conditions are produced for minimizing the manual actuation force to be applied to the manual actuation lever. Due to the co-operation of the support lever 36 with the opener lever 24 the manual actuation force is kept substantially less than if the opener lever 24 were connected directly by an opener lever pivot shaft with the manual actuation lever.

I claim:

1. Trailer coupling, comprising:
   (a) a coupling body;
   (b) a coupling bolt which is guided displaceably in the coupling body between a coupling position with engagement through a towing eye and a non-coupling position permitting the driving of the towing eye into and out of the coupling body;
   (c) an opener lever pivotable about an opener lever pivot spindle and stressed by first spring means in the direction towards a securing position in which it secures the coupling bolt in its coupling position, which opener lever is transferrable by means defining an actuating shaft against the action of the first spring means into a holding position in which it holds the coupling bolt in the non-coupling position;
   (d) a support lever pivotable about means defining a support lever pivot spindle, for supporting the opener lever in its holding position; and
   (e) a release lever pivotable about the support lever pivot spindle, displaceable transversely of this spindle and subject to the turning and displacement effect of further spring means, which release lever in the entry and exit of the towing eye runs through different sequences of operational positions and in the course of the operational position sequence effected by the entry of the towing eye transmits a release moment to the support lever in the direction of cancellation of its supporting function, characterized in that
   (f) the actuating shaft is offset parallel in relation to the opener lever pivot spindle;
   (g) the support lever is seated non-rotatably and non-displaceably on the actuating shaft and is in entraining engagement with the opener lever so that in pivoting out of a rest position into a support position it entrains the opener lever out of its securing position into its holding position;
   (h) the release lever is mounted rotatably and displaceably on the actuating shaft; and
   (i) on the support lever and the release lever there are fitted release moment transmission stops which, when the towing eye is moving out, shifting the release lever, pass into a mutual readiness position, and when the towing eye is entering, transmit a pivot release movement from the release lever to the support lever.

2. Trailer coupling according to claim 1, characterized in that the release lever is controlled by the further spring means, at least one pair of cooperating control stops on the release lever and on the coupling body and by the entry and exit of the towing eye, in such a way that
   (a) in the transference of the support lever out of the rest position into the support position and in its support position the release lever is held by the control stops and the towing eye, against the action of the further spring means, in a first operational position in which the one release moment transmission stop pertaining to it is out of engagement readiness in relation to the other release moment transmission stop pertaining to the support lever;
   (b) in the outward movement of the towing eye the release lever is pivoted and shifted under the action of the further spring means into a second operational position in which the control stops are lifted away from one another and the release moment transmission stops are in the engagement readiness position, and
   (c) the release lever is pivoted by the entering towing eye out of the second operational position, with entraining of the support lever by the cooperating release moment transmission stops, initially until the control stops have met again and then is simultaneously pivoted and displaced in the direction towards the first operational position, so that after shifting of the support lever out of its support position the release moment transmission stops are again out of engagement readiness.

3. Trailer coupling according to claim 2, characterized in that cooperating entraining stops are provided on the release lever and the support lever, which stops, in the transference of the release lever into the rest position, come together and bring the release lever into a third operational position in which the release lever is lifted away from the towing eye.

4. Trailer coupling according to claim 1, 2 or 3, characterized in that the further spring means are formed by a torsion spring which initially stresses the release lever and the support lever in the direction of rotation in relation to one another and at the same time initially stresses the release lever in the displacement direction in relation to the actuating shaft.

5. Trailer coupling according to claim 1, characterized in that the coupling bolt engages with a convex section in the towing eye.

6. Trailer coupling according to claim 1, wherein said means defining said support lever pivot spindle and said means defining said actuating shaft are a unitary body.

* * * * *